(12) United States Patent
Syrivelis et al.

(10) Patent No.: US 11,520,713 B2
(45) Date of Patent: Dec. 6, 2022

(54) DISTRIBUTED BUS ARBITER FOR ONE-CYCLE CHANNEL SELECTION USING INTER-CHANNEL ORDERING CONSTRAINTS IN A DISAGGREGATED MEMORY SYSTEM

(71) Applicant: INTERNATIONAL BUSINESS MACHINES CORPORATION, Armonk, NY (US)

(72) Inventors: Dimitrios Syrivelis, Dublin (IE); Andrea Reale, Dublin (IE); Kostas Katrinis, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 417 days.

(21) Appl. No.: 16/054,698

(22) Filed: Aug. 3, 2018

(65) Prior Publication Data

US 2020/0042468 A1    Feb. 6, 2020

(51) Int. Cl.
*G06F 13/36*      (2006.01)
*G06F 13/362*     (2006.01)
*G06F 13/16*      (2006.01)
*G06F 13/364*     (2006.01)

(52) U.S. Cl.
CPC ........ *G06F 13/1605* (2013.01); *G06F 13/364* (2013.01)

(58) Field of Classification Search
CPC ... G06F 13/1605; G06F 13/364; G06F 13/368
USPC ....................................................... 710/113
See application file for complete search history.

(56) References Cited

U.S. PATENT DOCUMENTS

| 4,991,084 A * | 2/1991 | Rodiger .............. G06F 13/1657 710/316 |
| 6,073,199 A | 6/2000 | Cohen et al. |
| 6,445,635 B1 * | 9/2002 | Au ........................... G06F 5/12 365/221 |
| 7,760,756 B1 * | 7/2010 | Basu ....................... H04L 47/60 370/413 |
| 7,768,519 B1 * | 8/2010 | Anderson ........... G06F 15/8053 345/505 |
| 7,886,097 B2 * | 2/2011 | Jung ..................... G06F 13/364 710/110 |
| 8,135,878 B1 | 5/2012 | Jain |
| 8,521,933 B2 | 8/2013 | Banerjee et al. |
| 8,532,098 B2 | 9/2013 | Reed et al. |

(Continued)

OTHER PUBLICATIONS

El-Kustaban et al., "A Bus Arbitration Scheme with an Efficient Utilization and Distribution," (IJACSA) International Journal of Advanced Computer Science and Applications, vol. 8, No. 3, 2017 (6 pages).

(Continued)

*Primary Examiner* — Chun Kuan Lee
(74) *Attorney, Agent, or Firm* — Griffiths & Seaton PLLC

(57) ABSTRACT

Embodiments using a distributed bus arbiter for one cycle channel selection with inter-channel ordering constraints. A distributed bus arbiter that orders one or more memory bus transactions originating from a plurality of master bus components to a plurality of shared remote slaves over shared serial channels attached to differing interconnect instances may be implemented.

15 Claims, 8 Drawing Sheets

(56) References Cited

U.S. PATENT DOCUMENTS

| | | | |
|---|---|---|---|
| 2001/0007563 A1* | 7/2001 | Hachinota | H04L 49/3018 370/545 |
| 2010/0272117 A1* | 10/2010 | Wu | H04L 49/101 370/413 |
| 2011/0010480 A1 | 1/2011 | Auernhammer | |
| 2013/0007386 A1 | 1/2013 | Wolf et al. | |
| 2014/0201471 A1 | 7/2014 | Cutter et al. | |
| 2016/0011996 A1* | 1/2016 | Asaad | G06F 15/76 710/308 |
| 2016/0026436 A1* | 1/2016 | Shen | G06F 5/14 712/43 |

OTHER PUBLICATIONS

Shashidhar et al., "Implementation of Bus Arbiter Using Round Robin Scheme," International Journal of Innovative Research in Science, Engineering and Technology, vol. 3, Issue 7, Jul. 2014 (8 pages).

Syrivelis et al., "A Software-defined SoC Memory Bus Bridge Architecture for Disaggregated Computing," AISTECS'18, Jan. 11, 2018 (4 pages).

Shete et al., "Study of High Performance AMBA AHB Reconfigurable Arbiter for On-Chip Architecture," International Journal of Electrical, Electronics and Data Communication, vol. 2, Issue 3, Mar. 2014 (5 pages).

Noorbasha et al., "Implementation of an Adaptive-Dynamic Arbitration Scheme for The Multilayer Ahb Busmatrix," Journal of Engineering Research and Applications (IJERA), vol. 2, Issue 4, Jul.-Aug. 2012 (7 pages).

Jamadagni et al., "Implementation of a Special Arbitration Scheme for AHB of AMBA," International Journal & Magazine or Engineering, Technology, Management and Research, vol. 2, Issue 11, Nov. 2015 (4 pages).

\* cited by examiner

DISTRIBUTED BUS ARBITER FOR ONE-CYCLE CHANNEL SELECTION USING INTER-CHANNEL ORDERING CONSTRAINTS IN A DISAGGREGATED MEMORY SYSTEM

BACKGROUND OF THE INVENTION

Field of the Invention

The present invention relates in general to computing systems, and more particularly to, various embodiments for serializing memory bus transactions.

Description of the Related Art

In today's interconnected and complex society, computers and computer-driven equipment are more commonplace. Processing devices, with the advent and further miniaturization of integrated circuits, have made it possible to be integrated into a wide variety of devices. Many computing systems include computer memory which may be accessed using memory bus protocols. Several memory bus standards have been developed to support different processor architectures, for example, QuickPath Interconnect (Intel®), Advanced Microcontroller Bus Architecture (ARM®), Coherent Accelerator Processor Interface (IBM®), and HyperTransport® (AMD®), etc.

SUMMARY OF THE INVENTION

Various embodiments for using a distributed bus arbiter for one cycle channel selection with inter-channel ordering constraints are provided. A distributed bus arbiter that orders one or more memory bus transactions originating from a plurality of master bus components to a plurality of shared remote slaves over shared serial channels attached to differing interconnect instances may be implemented.

BRIEF DESCRIPTION OF THE DRAWINGS

For the advantages of the invention to be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
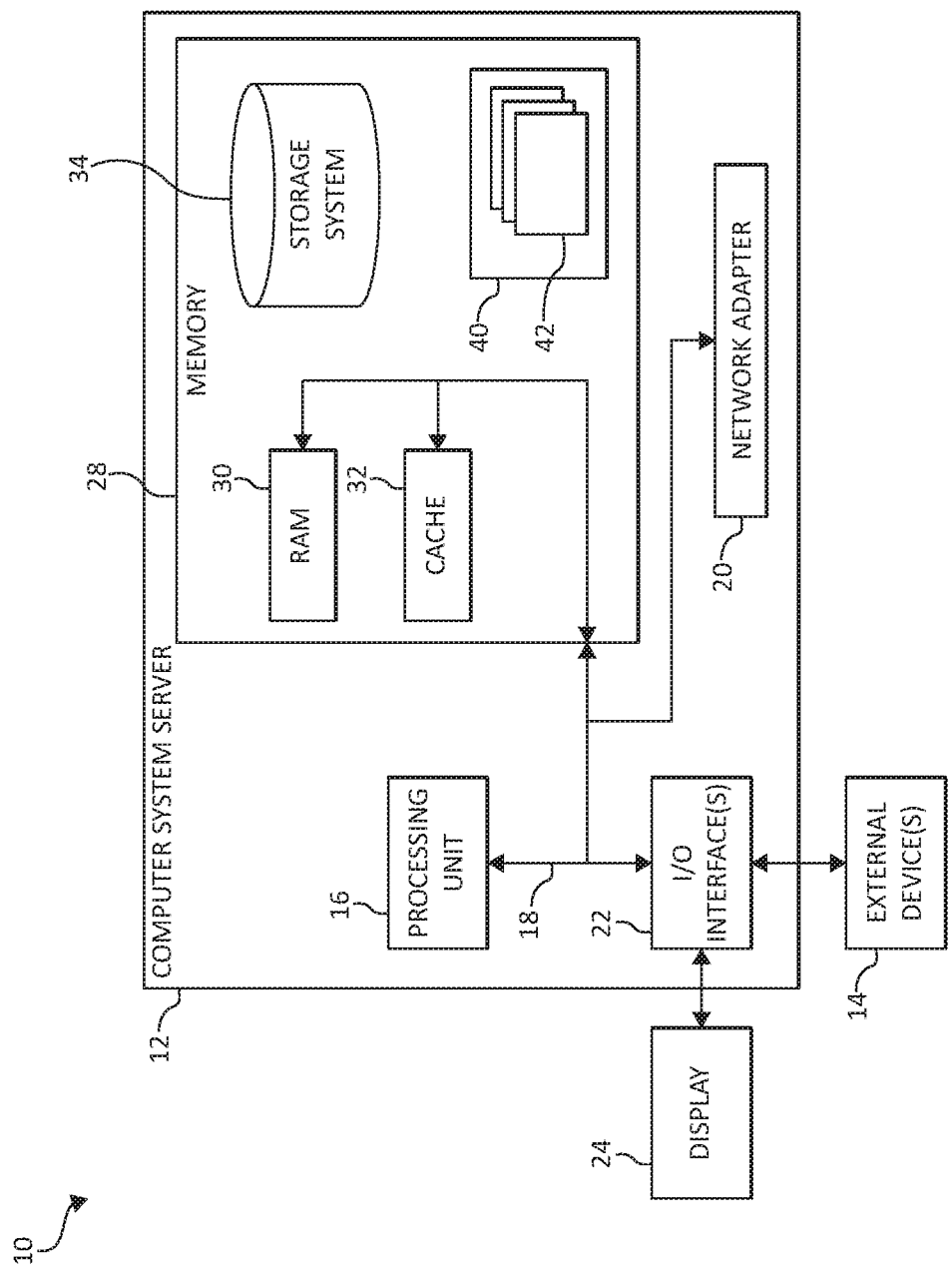
FIG. 1 is a block diagram depicting an exemplary cloud computing node according to an embodiment of the present invention.

Modern day computing systems often use multiple processors for obtaining greater processing speeds. The processors often share a common command bus, and arbitrate for control of the bus using a variety of arbitration techniques. Processors requesting actions to be performed by other devices are typically referred to as masters, and memory devices, input/output ("I/O") devices, and other processors function as slaves which communicate with the masters via the common command bus. A master/slave relationship functions such that a master initiates a request to a slave and the slave replies. Slaves may be designed to carry out a request silently without a reply. A typical bus transaction comprises a microprocessor as master, requesting data from a memory device as slave.

More specifically, non-disaggregated computing systems, such as, for example, a computer system used in cloud datacenters, the memory and processors (CPUs) are electrically interconnected via an high performance parallel bus. This allows to achieve the optimal and best performance. In non-disaggregated systems, memory bus transactions are initiated by bus masters. The non-disaggregated computing system's memory address space is statically partitioned across masters (e.g., each master is responsible for the transactions towards a disjoint partition of the address space). Memory bus transactions are received by bus slaves. Like masters, each slave is responsible of handling transactions towards a disjoint partition of the address space. Given the architecture of non-disaggregated computing, one slave always serves only one single master. One master can interact with multiple slaves, as illustrated in non-disaggregated computing system 410 of FIG. 4.

Disaggregated memory architectures break the electrically interconnected coupling and separate the CPUs from memory by bundling the CPUs and memory into physically different components, usually interconnected via high-speed serial links. This arrangement trades off performance for increased flexibility, better resource utilization, and ultimately for a reduced total cost of ownership (TCO) over the computing infrastructure. Requests are multiplexed over a switched network and associations between masters and the slaves are no longer statically partitioned, but may be dynamically reconfigured. For this reason, in disaggregated memory systems, one slave can serve concurrently more than one master, as illustrated in 420 of FIG. 4.

Moreover, in Parallel bus architectures (e.g., a shared channel that transmits data over several lines simultaneously), the parallel signal lines are grouped in logical channels. Each logical channel contains a group of signal lines that are not meaningful to handle independently. For example, all 64 signal lines that deliver a 64-bit memory address needs to be read as a unity. In addition, due to internal processor architecture, the memory address data is delivered from a different hardware unit than the one that delivers the actual data for that address. Thus, memory address data and actual data for that address may be delivered in different clock cycles. Parallel bus memory protocols have strict ordering constraints in the way input from different channels is delivered from masters to slaves. For example, in advanced extensible interface ("AXI") protocols, 1) the order of a sequence of inputs (or protocol units "Pus") on a "Write Address (WA)" channel ("{PU1(WA), PUn(WA)}") must match the order of the sequence of PUs on the "Write Data (WD)" channel: ("{PU1(WD), . . . , Pun (WD)}"). In this way, the slave knows that the nth input on the "Write Data" channel corresponds to the nth input of the "Write Address" channel. In addition to these ordering constraints, all channels may deliver data in parallel. In non-disaggregated memory bus architectures, given that there is no concurrency in accessing slaves, ordering constraints are guaranteed simply by ensuring that each master issues requests on the channels according to the expected order (see non-disaggregated computing system 410 of FIG. 4). In disaggregated systems, however, multiple masters can issue requests on the same slave concurrently (see 420 of FIG. 4). These requests are serialized over the network, and can reach the slave in an arbitrarily interleaved fashion if no component is in place to guarantee that the protocol ordering constraints are met.

Accordingly, the present invention provides for serializing memory bus transactions. That is, the present invention provides for a one-cycle bus arbiter logic that allows to serialize the channels of a parallel bus while satisfying inter-channel ordering constraints in a disaggregated memory system. In one aspect, the present invention provides, in a disaggregated memory system, a distributed bus arbiter for one cycle channel selection with inter-channel ordering constraints. The distributed bus arbiter may be implemented to order one or more memory bus transactions originating from a plurality of master bus components to a plurality of shared remote slaves over shared serial channels attached to differing interconnect instances. That is, the distributed bus arbiter is enabled to ensure required serialization of memory bus transactions (e.g., guaranteeing correct serialization) starting from a plurality of master bus components to a plurality of shared remote slaves over shared serial channels attached to differing interconnect instances. The distributed bus arbiter also guarantees that, at each time ("t"), the operations needed for selecting the appropriate input to deliver to a slave take at most one clock cycle.

In an additional aspect, a distributed bus arbiter guarantees the correct serialization of memory bus transactions started by many master bus components towards many shared remote slaves, over shared serial channels, that may be also attached to different interconnect instances. The distributed bus arbiter guarantees the required orderings by filtering the input mask of existing selection logic circuits (e.g., round-robin arbiters) according to inter-channel dependency constraints. The distributed bus arbiter uses bit-masks to express inter-channel dependency constraints. The distributed bus arbiter makes the correct selections to transmit over the shared serialized channel in one clock cycle. A first-in-first-out (FIFO) queue may be used to hold the dependency bitmasks in the correct order and to select the current input vector filtering bitmask. More specifically, the bitmask is a bit array where each bit is assigned to enable (value 1) or disable (value 0) that enables or disables the selectability of a specific input.

As used herein, an input channel may be an electrical line connected to the distributed bus arbiter (e.g., arbiter logic). The distributed bus arbiter handles two or more input channels. The electrical line can be either 1-bit wide or n-bit wide, depending on the bus protocol. With the goal of facilitating the present invention, 1-bit wide serial lines may be used herein; however the present invention applies to n-bit wide channels.

The input channel produces discrete input units which consist of a sequence of bits called protocol Units (PUs). The format and semantics of PUs can be different for each of the channels and are dependent on the bus protocol. In one aspect, the PUs are not dependent on the specific format.

An input request vector 502 (e.g., vector 502, FIG. 5) may be a bit mask whose length is equal to the number of input channels connected the distributed bus arbiter. Each bit corresponds to one of the input channels. Each bit of the input request vector 502 may be connected to a signal that indicates that the respective PU channel buffer has PUs available. Therefore, the ith bit of the vector indicates that the specific input channel buffer has a PU available that satisfies the distributed bus arbiter ordering constraints and thus is a candidate for selection.

A selection vector 506 may be a one-hot bit mask encoding (this encoding guarantees that in every clock cycle only one bit may have the value of one whereas the rest will have the value of zero) whose length is equal to the number of input channels connected to the arbiter. Each bit corresponds to one of the input channels. The selection vector 506 may be the output of the distributed bus arbiter. A single high bit in the vector corresponds to the input channel from which the next PU is to be taken to be serialized.

Selection components (e.g., selection logic) may be a set of hardware components (e.g., set of hardware logic) that takes as input an input request vector 502 and outputs a one-hot selection vector 506. Existing arbiter designs (e.g., a round robin arbiter) can be used to implement the selection logic.

Every channel $C_i$ can have associated zero or one channel constraints. A channel constraint determines whether channel data can be forwarded or not regardless if channel data are available in a channel input buffer. For any given channel, the channel constraint may be applied or not applied based on what data have been previously forwarded from other channels, which impose the constraint to the current channel. The channel constraints ensure that memory transactions (which are assembled by PUs forwarded from different channels) have bytes of the memory transactions issued in a correct/right serial order (i.e. properly serialized). Depending on the channel data type, some channels have channel constraints whereas other channels do not have channel constraints. A channel constraint $X(C_i)$ associates channel $C_i$ with another input channel $C_j$ (e.g., $C_j=X(C_i)$, the constrained channel).

A constraint producing channel may be any channel that is associated with a channel constraint. A constrained channel may be any channel that is subject to a constraint. (e.g., a channel $C_j$ is constrained if there is at least one $C_j$ so that $X(C_j)=X(C_i)$.

A freely selectable channel may be any channel that is not a constrained channel. In one aspect, the present invention uses channel constraints to express the ordering dependencies among PUs produced by input channels of the same distributed bus arbiter.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in a moving vehicle. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
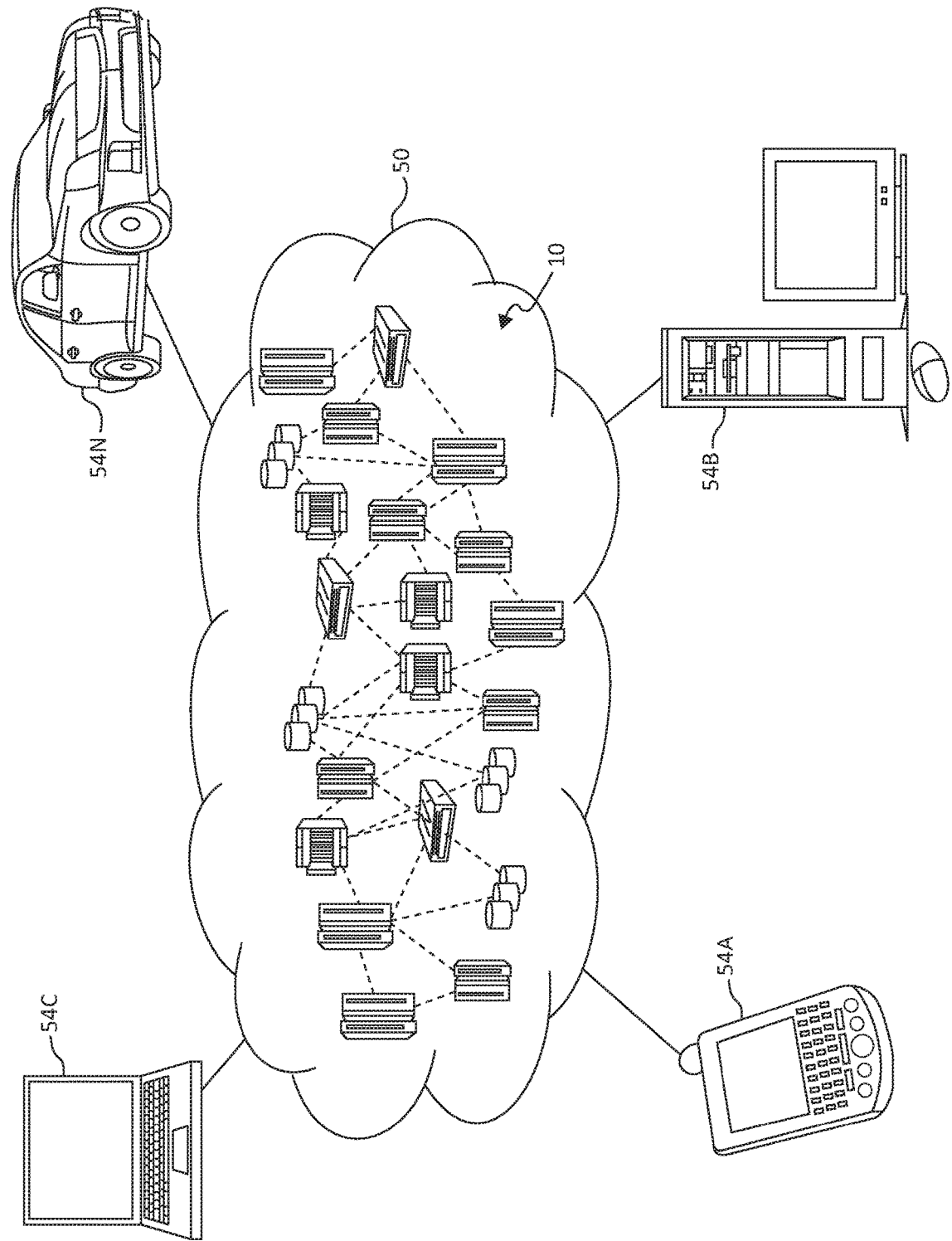
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
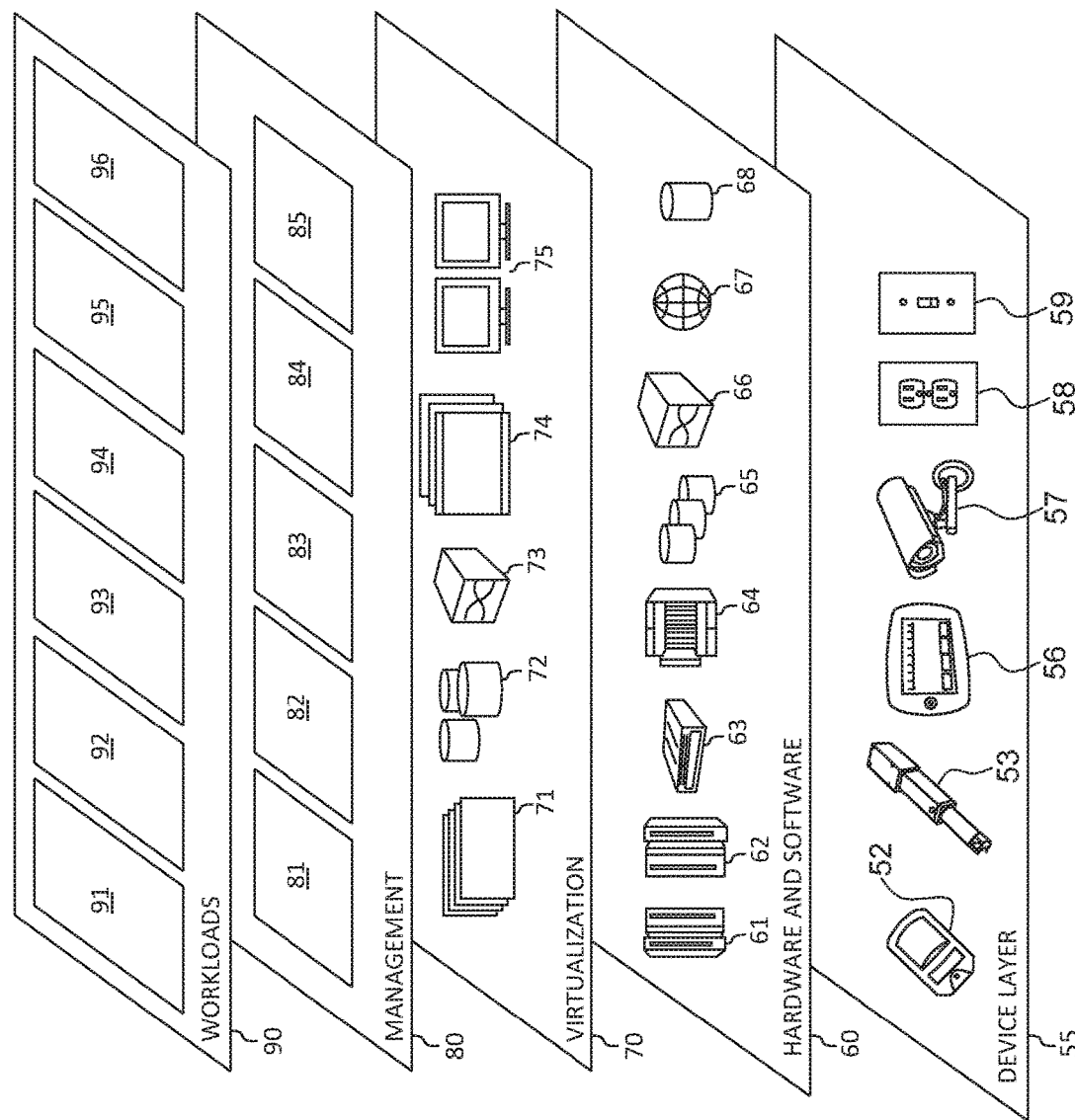
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "interne of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for using a distributed bus arbiter for one cycle channel selection with inter-channel ordering constraints. In addition, workloads and functions 96 for using a distributed bus arbiter for one cycle channel selection with inter-channel ordering constraints may include such operations as data analysis. One of ordinary skill in the art will appreciate that the workloads and functions 96 for using a distributed bus arbiter for one cycle channel selection with inter-channel ordering constraints may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
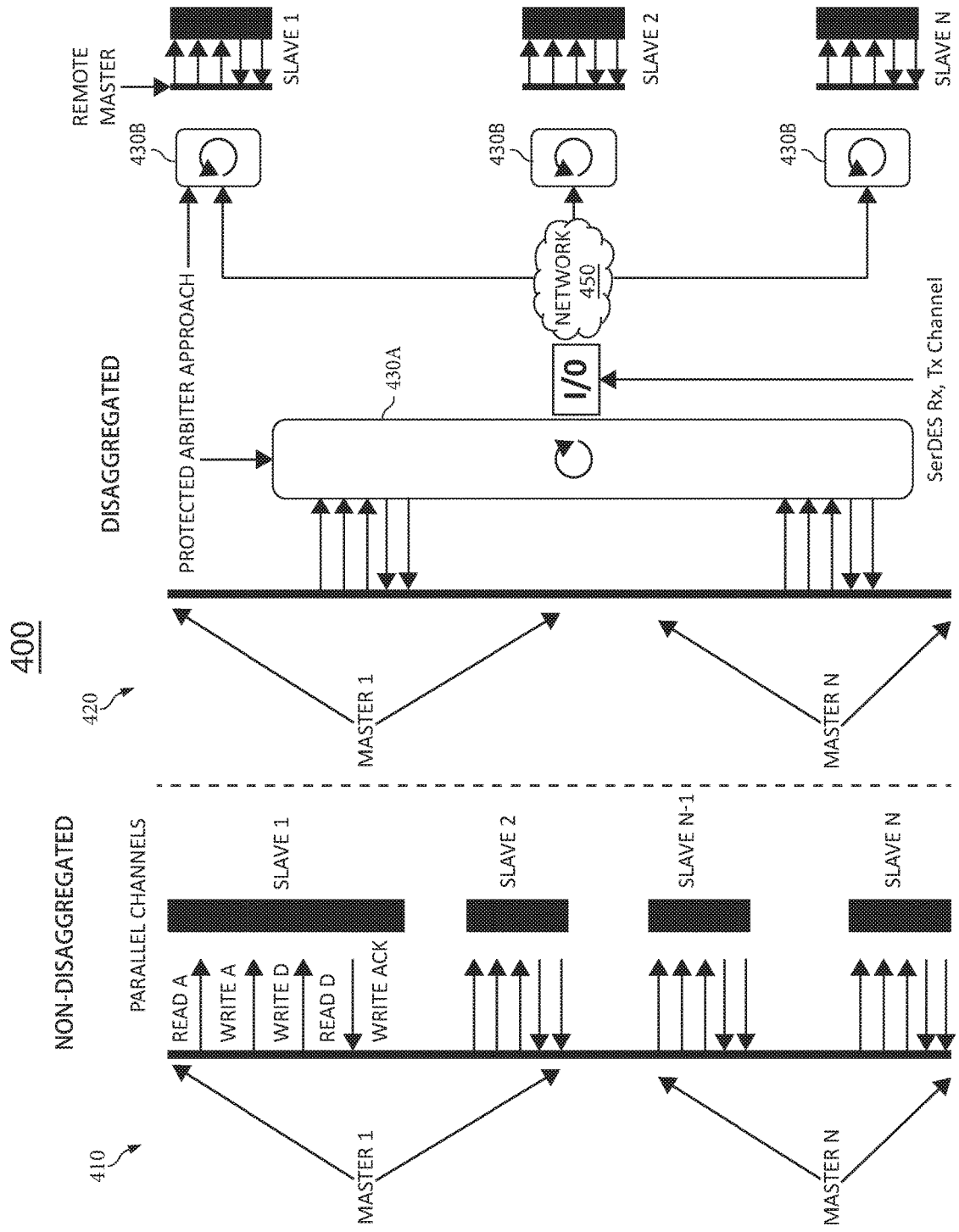
FIG. 4 is a diagram depicting non-disaggregated system compared to a disaggregated system in accordance with aspects of the present invention.

Turning now to diagram 400 of FIG. 4, a non-disaggregated system 410 is illustrated with memory bus transactions (e.g., Read A, Write A, Write D, Read D, Write ACK "acknowledgement") are initiated by bus masters (e.g., master 1 and/or master n) and are received by bus slaves (e.g., slave 1, slave 2, slave n-1, and/or slave n). One slave always serves only one single master. For example, slave 1 only servers master 1. Slave 2 only servers master 1. Slave n-1 only servers master n, and slave n only servers master n. However, each master can interact with multiple slaves, as illustrated in 410 of FIG. 4.

Alternatively, a disaggregated system 420 is depicted and breaks the electrically interconnected coupling and separate the CPUs from memory by bundling the CPUs and memory into physically different components, usually interconnected via high-speed serial links. More specifically, the disaggregated system 420 includes a distributed bus arbiter 430 positioned on the master side (e.g., master 1 and master n) and also positioned on the slave side (e.g., slaves 1, 2, and n) separated only by network 450.

In the disaggregated system 420, the distributed bus arbiter 430 operates both on the master side (see distributed bus arbiter 430A), before the network 450, and on the disaggregated slaves side (see distributed bus arbiter 430B), after the network 450. On the master side (e.g., the master 1 and master 2), the distributed bus arbiter 430 receives PUs from multiple masters (e.g., the master 1 and master 2) and serializes the PUs over the shared network link(s) (e.g., network 450) in a correct order. On the "disaggregated" slaves side, the distributed bus arbiter 430 receives serialized PUs from incoming network link(s) (e.g., network 450) and delivers the serialized PUs to a parallel bus channel restoring the intended interconnect protocol ordering. Request are multiplexed over a switched network and associations between masters and the slaves are no longer statically partitioned, but may be reconfigured dynamically. For this reason, in disaggregated memory systems, one slave can serve concurrently more than one master such as, for example, slave 1 may serve both master 1 and master n, as illustrated in 420 of FIG. 4.

Figure 5:
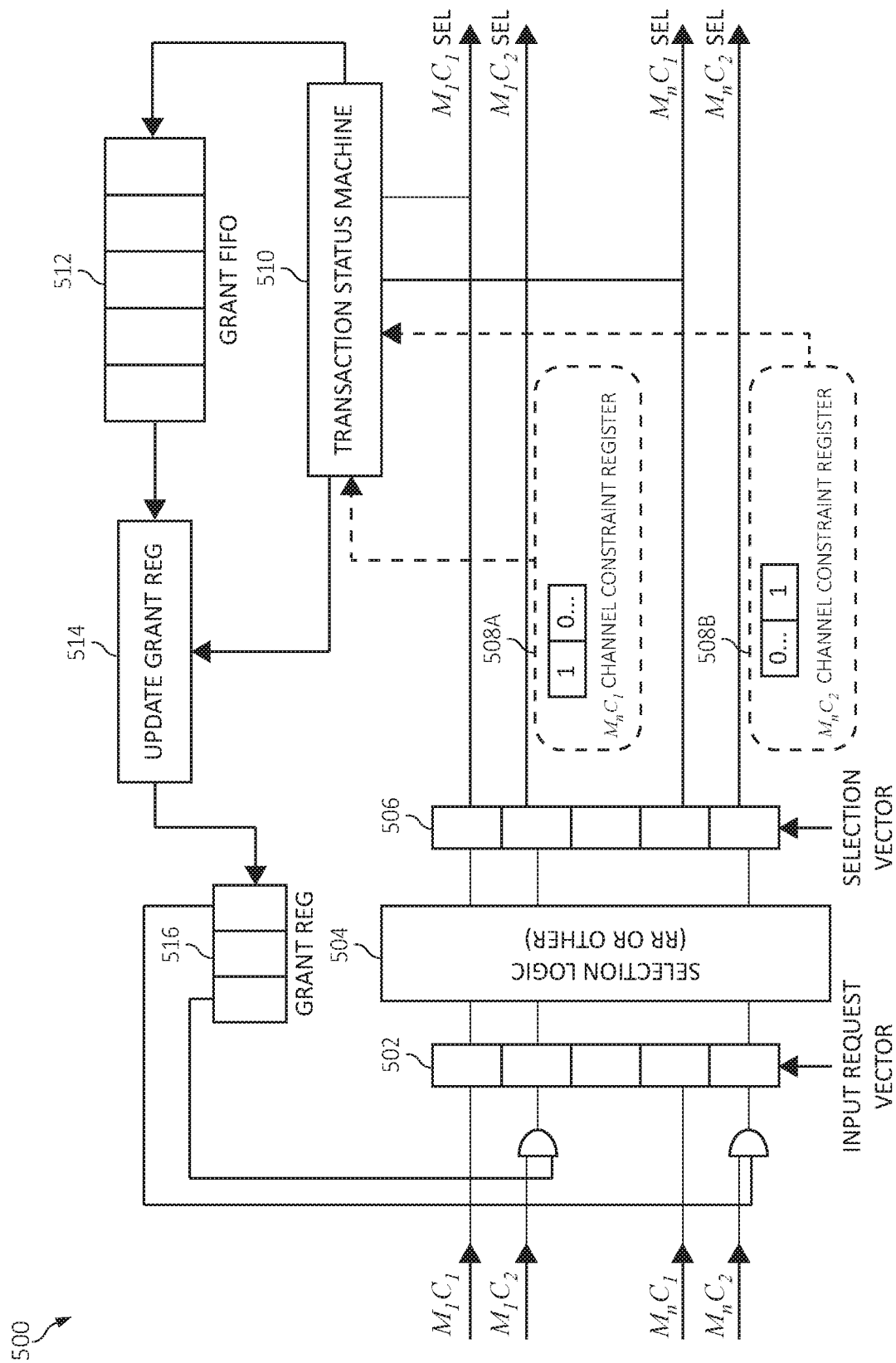
FIG. 5 is a block diagram depicting an exemplary functional relationship between various aspects of the present invention.

Turning now to FIG. 5, diagram depicting a schematic of a distributed bus arbiter 500 and an example of a functional relationship between components of the distributed bus arbiter. In one aspect, each of the devices, components, modules, and/or functions described in FIGS. 1-4 may also apply to the devices, components, modules, and functions of FIG. 5. Also, one or more of the operations and steps of FIGS. 1-4 may also be included in one or more operations or actions of FIG. 5.

In one aspect, the distributed bus arbiter 500 may include a grant register 516 ("grant reg"), which holds a grant mask (e.g., a one-hot bitmask where each bits represents one constrained channel). The only '1' bit in the mask means that PUs produced by the corresponding channel are allowed to be selected by the selection logic 504 (e.g., round robin arbiter). The input request vector 502 (e.g., vector 502, FIG. 5) may be a bit mask whose length is equal to the number of input channels connected the distributed bus arbiter. Each bit corresponds to one of the input channels. Each bit of the input request vector 502 may be connected to a signal that indicates that the respective PU channel buffer has PUs available. Therefore, the ith bit of the vector indicates that the specific input channel buffer has a PU available that satisfies the distributed bus arbiter ordering constraints and thus is a candidate for selection. The selection vector 506 may be a one-hot bit mask encoding (this encoding guarantees that in every clock cycle only one bit may have the value of one whereas the rest will have the value of zero) whose length is equal to the number of input channels connected to the arbiter. Each bit corresponds to one of the input channels. The selection vector 506 may be the output of the distributed bus arbiter (e.g., distributed bus arbiter 430 of FIG. 4). A single high bit in the vector corresponds to the input channel from which the next PU is to be taken to be serialized. Selection logic 504 (e.g., selection logic) may be a set of hardware components (e.g., set of hardware logic) that takes as input the input request vector 502 and outputs the one-hot selection vector 506.

The distributed bus arbiter 500 may include a grant FIFO 512, which holds a queue of grant masks to be set in the grant register. The distributed bus arbiter 500 may include one or more channel constraint registers (e.g., channel constraint registers 508A and 508B), which holds, for each constraint producing channel, a one-hot bitmask. Each bit in the mask represents one constrained channel. A '1' in the mask means that PUs produced by the corresponding channel are allowed to be selected by the selection logic 504 according to the constraint.

The distributed bus arbiter 500 may include a transaction status state machine 510, which updates the grant register 516 (as illustrated in "update grant register" block 514) and grant register FIFO 512 based on the PUs received over the arbitrated channels and based on knowledge of the target memory bus protocol.

To illustrate the functional operation of the distributed bus arbiter 500, it may be assumed there are an n number of masters, each with two channels $M_i\,C_1$ and $M_i\,C_2$. The 2*n input channels (e.g., $M_i\,C_1$ and $M_i\,C_2$) may be arbitrated using the distributed bus arbiter 500.

In the example, a master $M_i$ initiates a transaction by producing a PU on $M_i\,C_1$. The transaction is completed when a PU is received on $M_i\,C_2$. In the example, the operations of distributed bus arbiter 500 may perform the following.

Given any two transactions produced by two $M_i$ and $M_j$ (e.g., {PU($M_i\,C_1$), PU($M_i\,C_2$)} and {PU($M_j\,C_1$), PU($M_j\,C_2$)}). In any serialization produced by the distributed bus arbiter 500, if PU($M_i\,C_1$) appears before PU($M_j\,C_1$), then PU($M_i\,C_2$) will appear before PU($M_j\,C_2$). Moreover, transaction order is preserved for any transaction (i.e., for any master $M_i$ and any serialization, PU($M_i\,C_1$) will appear before PU($M_i\,C_2$). For example, for the AXI bus protocol, assume $C_1$ is mapped on the "write address" channel and $C_2$ is mapped on the "write data" channel. The distributed bus arbiter 500 guarantees that the serialized order of "write data" PUs matches the serialized order of the "write address" PUs.

In one aspect, one or more constraints may be associated to all $M_i\,C_1$ channels, so that X($M_i\,C_1$) equals ("=") $M_i\,C_2$ for all "ith" masters. All $M_i\,C_1$ channels may be constraint producing and freely selectable channels. All $M_i\,C_2$ may be constrained channels. In one embodiment, one channel constraint register (e.g., channel constraint register 508A and/or 508b) may be used for each constraint producing channel. The (e.g., channel constraint register 508A and/or 508b) may hold a n-bits masks (one bit for each constrained channel). The bitmask of channel $M_i\,C_1$ may be a one-hot mask where the only '1' bit corresponds to the channel $M_i\,C_2$. When this mask is active, the only selectable constrained channel will be $M_i\,C_2$.

At time zero ("t=0"), the grant register 516 may be set to 0 (i.e., only freely selectable channels can be selected). These freely selectable channels may produce PUs that will start bus transactions. Whenever any channel is selected by the selection logic 504, the data coming from the channel is examined by the transaction state machine 510. The transaction state machine 510 may be aware of the specific memory bus protocol. The role of the transaction state machine 510 is to recognize the boundaries of PUs and trigger updates to the grant register 516 and grant register FIFO 512, accordingly.

When a PU from a freely selectable channel is completely serialized, the transaction state machine 510 may push the content of the corresponding channel constraint register 508 and/or 508B in the grant register FIFO 512. If the grant register FIFO 512 is empty, the grant register FIFO 512 may update the content of the grant register 516 directly with the same value.

In the example, when a PU from $M_i\,C_1$ is fully serialized, the corresponding grant mask that blocks all $M_j\,C_1$ (i≠j) is put in the grant FIFO 512. When this mask reaches the head of the grant FIFO 512 (this happens immediately if the FIFO is empty), all $M_j\,C_2$ may be blocked from being selected. It should be noted that this mask does not block any other $M_j\,C_1$ from being concurrently selected. This means that, while the channel constraint from $M_i\,C_1$ is active, other transactions can be started from different masters ($M_j\,C_1$) and their PUs serialized. However, no other PU($M_i\,C_2$) can be serialized, thus ensuring that the required serialization order is preserved. When a PU from the active constrained channel $M_i\,C_2$ is eventually selected, then the grant register 516 is updated with next grant mask from the grant FIFO 512. If the grant FIFO 512 is empty, the grant register 516 is reset to 0.

Figure 6:
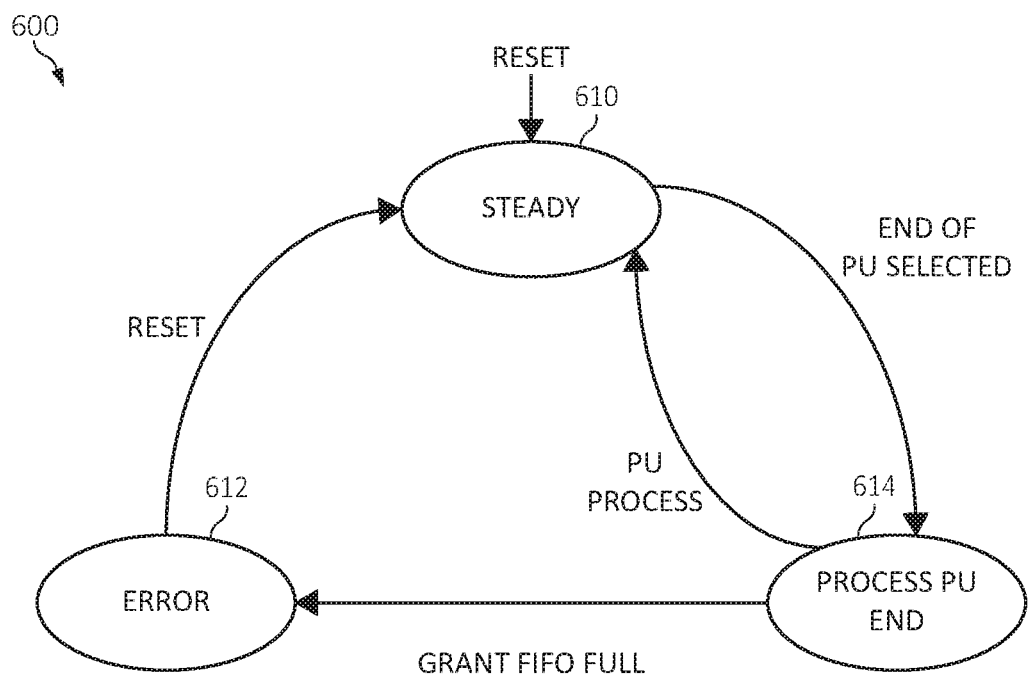
FIG. 6 is a diagram depicting a transaction status state machine diagram in accordance with aspects of the present invention.

Turning now to FIG. 6, a transaction status state machine diagram 600 for the transaction state machine 510 of FIG. 5 is depicted. At steady state 610, the transaction status state machine 510 keeps monitoring the data coming from input channels as it is serialized and, based on the bus protocol, the transaction status state machine 510 attempts to detect the boundaries of PUs being serialized. A detection of PU ends triggers state transition to "Process PU end" which indicates that the current Protocol transaction is complete and all PUs have been properly exchanged state 614. The "Process PU end" state 614 is a pseudo-state and it transitions back to steady state 610 once the actions corresponding to the transition event are completed. The state transitions to an error state 612 upon the grant FIFO 512 becoming full and resets back to steady state 610.

Figure 7:
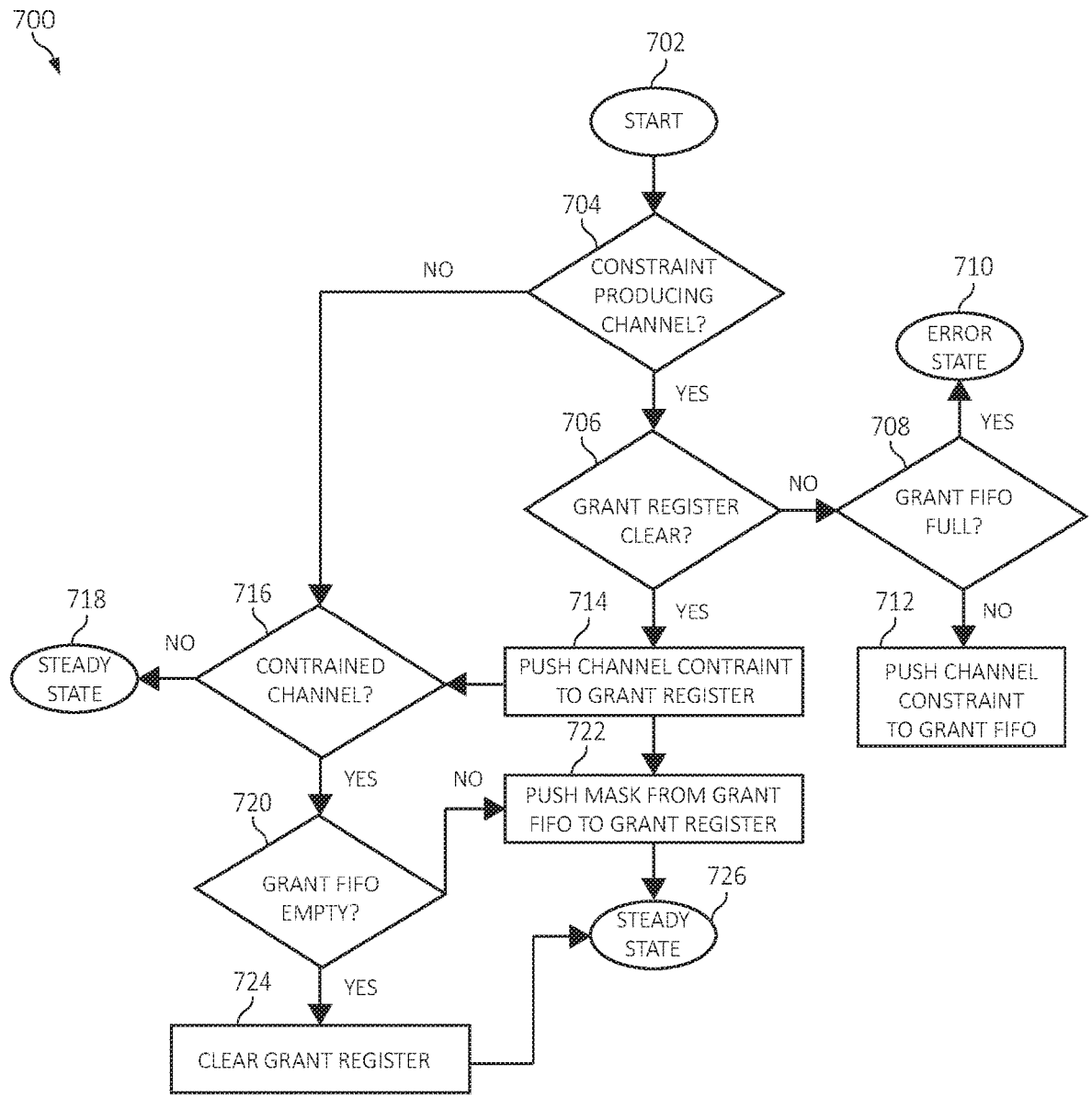
FIG. 7 is a flowchart diagram depicting an exemplary method for processing protocol units (PU) back to a steady state upon completion of actions corresponding to transition events unit in which aspects of the present invention may be realized.

FIG. 7 is a flowchart diagram depicting an exemplary method 700 for process protocol unit (PU) end back to a steady state upon completion of actions corresponding to transition events unit, in which various aspects of the illustrated embodiments may be implemented. The functionality 700 may be implemented as a method executed as instructions on a machine, where the instructions are included on at least one computer readable storage medium or one non-transitory machine-readable storage medium.

The functionality 700 may start in block 702. A determination operation may be performed to determine a constraint producing channel, as in decision step 704. If yes, the method 700 moves to decision step 706 to determine if a grant register is clear. If no, method 700 moves to decision step 708 to determine if a grant FIFO is full. If yes at decision step 708, an error state occurs, as in block 710. If no at decision step 708, a channel constraint is pushed to the grant FIFO, as in block 712.

Returning to decision step 706, if yes at decision step 706, a channel constraint is pushed to the grant register, as in block 714. The method 700 moves to decision step 716 from block 714. Returning to block 704, if no at block 704 (and also from block 714), a determination operation may be performed to determine if a channel is constrained, as in decision step 716. If no, a steady state occurs, as in block 718. If yes at decision step 716, method 700 moves to decision step 720 to determine if a grant FIFO is empty. If yes at decision step 720, the grant register is cleared, as in block 724. The method 700 may move to block 726 and a steady state occurs. If no at decision step 720, a bit mask from the grant FIFO may be pushed to the grant register, as in block 722. The method 700 may move from block 722 to block 726 and a steady state occurs.

Figure 8:
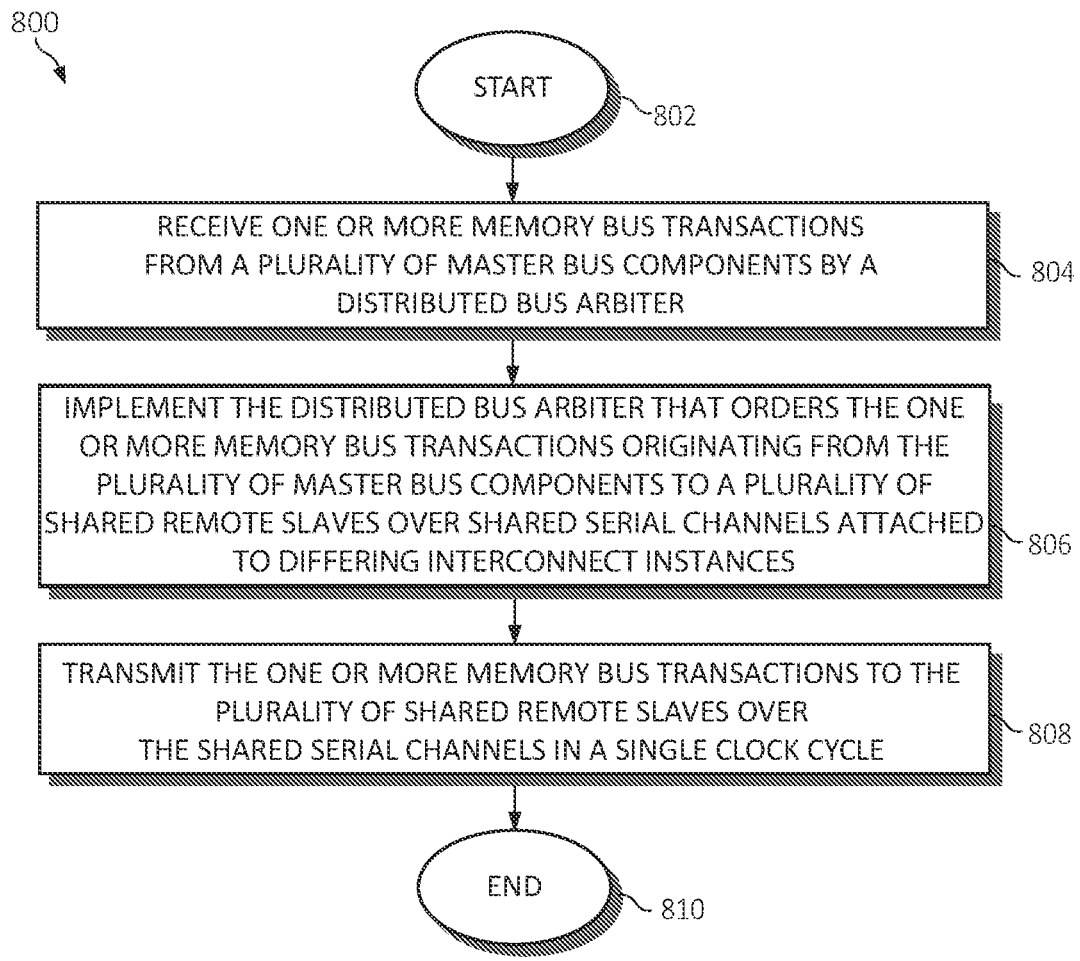
FIG. 8 is a flowchart diagram depicting an additional exemplary method for using a distributed bus arbiter for one cycle channel selection with inter-channel ordering constraints in which aspects of the present invention may be realized.

FIG. 8 is a flowchart diagram depicting an exemplary method 800 for using a distributed bus arbiter for one cycle channel selection with inter-channel ordering constraints, in which various aspects of the illustrated embodiments may be implemented. The functionality 800 may be implemented as a method executed as instructions on a machine, where the instructions are included on at least one computer readable storage medium or one non-transitory machine-readable storage medium.

The functionality 800 may start in block 802. One or more memory bus transactions from a plurality of master bus components by a distributed bus arbiter, as in block 804. The distributed bus arbiter that orders the one or more memory bus transactions originating from the plurality of master bus components to a plurality of shared remote slaves over shared serial channels attached to differing interconnect instances may be implemented, as in block 806. The one or more memory bus transactions may be transmitted to the plurality of shared remote slaves over the shared serial channels in a single clock cycle, as in block 808. The functionality 800 may end in block 810.

In one aspect, in conjunction with and/or as part of at least one block of FIG. 8, the operations of method 800 may include one or more of each of the following. The operations of method 800 may receive, by the distributed bus arbiter, the one or more memory bus transactions from one or more of plurality of master bus components and serializing the one or more memory bus transactions over the shared serial channels in a required order, and/or receive, by the distributed bus arbiter, serialized memory bus transactions from incoming networks.

An input mask of one or more existing arbiter components may be filtered for ensuring the required serialization of memory bus transactions. One or more channel constraints may be used to express ordering dependencies among each protocol unit, associated with the memory bus transactions, produced by one or more input channels of the distributed bus arbiter. One or more bit-masks may be used to express the inter-channel ordering constraints.

The operations of method 800 may use a FIFI queue to hold the one or more bit-masks in a required order and to select a current input vector filtering policy. The operations of method 800 may also transmit each of the memory bus transactions over the shared serial channels in one clock cycle.

Thus, as described herein, the present invention provides a memory access broker system that guarantees data integrity and deterministic program execution, while significantly improving application performance for memory write accesses. The memory access broker system may include a hardware memory write access request broker that facilitates fast EWACK and notification of failed write requests to issuing applications. The memory access broker system can be selectively enabled at runtime to serve applications that have the required support to exploit it safely, without affecting the execution integrity of concurrently active legacy applications. The memory access broker system comprises an operating system and application programming interface support for application level control, write integrity checks, and barriers for application-level handling of failed writes.

In this way, the present invention provides added feature and advantage over the current state of the art by effectively enabling, from a performance perspective, the use of remote memory in a variety of computing systems and architectures such as, for example, cloud and data-centric systems. More specifically, the memory access broker with application-controlled early write acknowledgment support may be implemented in and used with disaggregated memory (e.g., "extended memory"). Thus, without the memory access broker system, memory writes will continue to be of prohibitively high latency, thus diminishing the return and value of remote or extended memory.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for serializing memory bus transactions, comprising:
    implementing a distributed bus arbiter that orders one or more memory bus transactions originating from a plurality of master bus components to a plurality of shared remote slaves over shared serial channels attached to differing interconnect instances, wherein at least some of the one or more memory bus transactions that are ordered comprise multiple requests from the plurality of master bus components delivered concurrently to a single one of the plurality of shared remote slaves;
    using one or more bit-masks to express inter-channel ordering constraints of the one or more memory bus transactions, wherein the one or more bit-masks are encoded to a length equal to a number of one or more input channels of the shared serial channels connected to the distributed bus arbiter such that each bit of the one or more bit-masks corresponds to a respective channel of the input channels, and wherein a value of each bit indicates whether the respective input channel to which each bit corresponds has satisfied one or more channel constraints and is therefore available for selection when ordering the one or more memory bus transactions, the one or more channel constraints based on current channel data previously forwarded from another of the one or more input channels; and
    selecting one of the one or more input channels and transmitting each of the memory bus transactions over the shared serial channels in one clock cycle.

2. The method of claim 1, further including:
    receiving, by the distributed bus arbiter, the one or more memory bus transactions from one or more of plurality of master bus components and serializing the one or more memory bus transactions over the shared serial channels in a required order; or
    receiving, by the distributed bus arbiter, serialized memory bus transactions from incoming networks.

3. The method of claim 1, further including filtering an input mask of one or more existing arbiter components for ensuring the required serialization of memory bus transactions.

4. The method of claim 1, further including using the one or more channel constraints to express ordering dependencies among each of a plurality of protocol units, associated with the memory bus transactions, produced by the one or more input channels of the distributed bus arbiter.

5. The method of claim 1, further including using a first-in-first-out (FIFO) queue to hold the one or more bit-masks in a required order and to select a current input vector filtering policy.

6. A system for serializing memory bus transactions, comprising:
    one or more computers with executable instructions that when executed cause the system to:
        implement a distributed bus arbiter that orders one or more memory bus transactions originating from a plurality of master bus components to a plurality of shared remote slaves over shared serial channels attached to differing interconnect instances, wherein at least some of the one or more memory bus transactions that are ordered comprise multiple requests from the plurality of master bus components delivered concurrently to a single one of the plurality of shared remote slaves;

use one or more bit-masks to express inter-channel ordering constraints of the one or more memory bus transactions, wherein the one or more bit-masks are encoded to a length equal to a number of one or more input channels of the shared serial channels connected to the distributed bus arbiter such that each bit of the one or more bit-masks corresponds to a respective channel of the input channels, and wherein a value of each bit indicates whether the respective input channel to which each bit corresponds has satisfied one or more channel constraints and is therefore available for selection when ordering the one or more memory bus transactions, the one or more channel constraints based on current channel data previously forwarded from another of the one or more input channels; and select one of the one or more input channels and transmit each of the memory bus transactions over the shared serial channels in one clock cycle.

7. The system of claim 6, wherein the executable instructions:

receive, by the distributed bus arbiter, the one or more memory bus transactions from one or more of plurality of master bus components and serializing the one or more memory bus transactions over the shared serial channels in a required order; or receive, by the distributed bus arbiter, serialized memory bus transactions from incoming networks.

8. The system of claim 6, wherein the executable instructions filter an input mask of one or more existing arbiter components for ensuring the required serialization of memory bus transactions.

9. The system of claim 6, wherein the executable instructions use the one or more channel constraints to express ordering dependencies among each of a plurality of protocol units, associated with the memory bus transactions, produced by the one or more input channels of the distributed bus arbiter.

10. The system of claim 6, wherein the executable instructions use a first-in-first-out (FIFO) queue to hold the one or more bit-masks in a required order and to select a current input vector filtering policy.

11. A computer program product for serializing memory bus transactions by a processor, the computer program product comprising a non-transitory computer-readable storage medium having computer-readable program code portions stored therein, the computer-readable program code portions comprising:

an executable portion that implements a distributed bus arbiter that orders one or more memory bus transactions originating from a plurality of master bus components to a plurality of shared remote slaves over shared serial channels attached to differing interconnect instances, wherein at least some of the one or more memory bus transactions that are ordered comprise multiple requests from the plurality of master bus components delivered concurrently to a single one of the plurality of shared remote slaves;

an executable portion that uses one or more bit-masks to express inter-channel ordering constraints of the one or more memory bus transactions, wherein the one or more bit-masks are encoded to a length equal to a number of one or more input channels of the shared serial channels connected to the distributed bus arbiter such that each bit of the one or more bit-masks corresponds to a respective channel of the input channels, and wherein a value of each bit indicates whether the respective input channel to which each bit corresponds has satisfied one or more channel constraints and is therefore available for selection when ordering the one or more memory bus transactions, the one or more channel constraints based on current channel data previously forwarded from another of the one or more input channels; and an executable portion that selects one of the one or more input channels and transmits each of the memory bus transactions over the shared serial channels in one clock cycle.

12. The computer program product of claim 11, further including an executable portion that:

receives, by the distributed bus arbiter, the one or more memory bus transactions from one or more of plurality of master bus components and serializing the one or more memory bus transactions over the shared serial channels in a required order; or receives, by the distributed bus arbiter, serialized memory bus transactions from incoming networks.

13. The computer program product of claim 11, further including an executable portion that filters an input mask of one or more existing arbiter components for ensuring the required serialization of memory bus transactions.

14. The computer program product of claim 11, further including an executable portion that uses the one or more channel constraints to express ordering dependencies among each of a plurality of protocol units, associated with the memory bus transactions, produced by the one or more input channels of the distributed bus arbiter.

15. The computer program product of claim 11, further including an executable portion that uses a first-in-first-out (FIFO) queue to hold the one or more bit-masks in a required order and to select a current input vector filtering policy.

* * * * *